Nov. 8, 1938. A. RYDQUIST Re. 20,911

WINDOW CHANNEL

Original Filed Nov. 10, 1933

INVENTOR
Adolph Rydquist
BY Edward K. Cumpston
his ATTORNEY

Reissued Nov. 8, 1938

Re. 20,911

UNITED STATES PATENT OFFICE 20,911

WINDOW CHANNEL

Adolph Rydquist, Rochester, N. Y., assignor to The Schlegel Manufacturing Company, Rochester, N. Y., a corporation of New York Original No. 2,037,487, dated April 14, 1936, Serial No. 697,464, November 10, 1933. Application for reissue August 25, 1936, Serial No. 97,833

17 Claims. (Cl. 296—44.5)

This invention relates to window channels such as are used for mounting a glass or sash in a vehicle, such, for example, as an automobile, aeroplane, motorboat, or the like. Under certain conditions, it is desirable to provide what may be termed a "deep" channel having more depth than the ordinary conventional window channel, so that the glass or sash may have a substantial movement transversely of the channel without actually leaving or pulling out of the channel. It is to such "deep" window channels that the present invention particularly relates, although many of the features of the invention are applicable also to other forms of channel.

One object of the invention is the provision of a generally improved and more satisfactory deep window channel.

Another object is the provision of improved means for holding one or more cushioning elements in position on the window channel.

Still another object is the provision of a deep window channel having a sheet metal body which is relatively small in comparison to the depth of the complete channel.

A further object is the provision, in a window channel, of improved means for holding a cushioning element, and particularly of such means in connection with an element which is substantially in the plane of a side wall of the channel and extends outwardly to form a continuation of the side wall.

To these and other ends the invention resides in certain improvements and combinations of parts, all as will be hereinafter more fully described, the novel features being pointed out in the claims at the end of the specification.

In the drawing.

The same reference numerals throughout the several views indicate the same parts.

Figure 1:
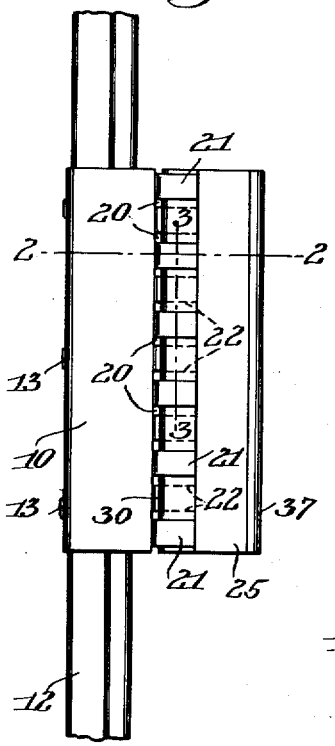
Fig. 1 is a side elevation of a window channel constructed in accordance with one embodiment of the invention.
Figure 5:
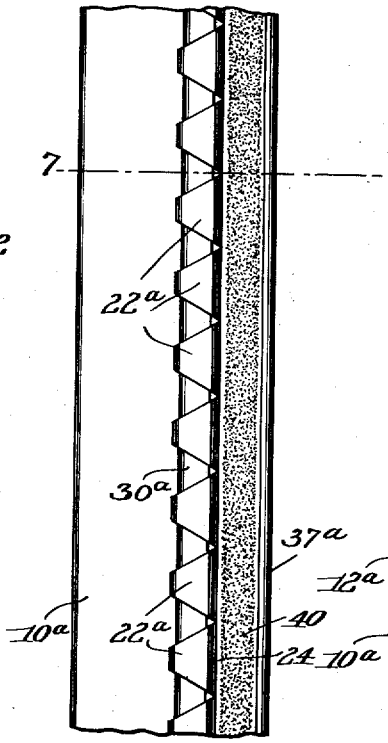
Fig. 5 is a side elevation of a channel constructed in accordance with another embodiment of the invention.
Figure 6:
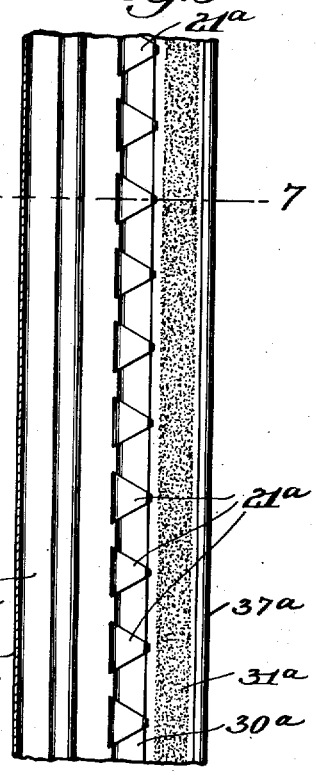
Fig. 6 is a view similar to Fig. 5 with one wall of the channel broken away to show the interior construction.

Referring now to the embodiment of the invention illustrated in Figs. 1 to 4 inclusive, there is shown what might be termed a "deep" channel member having side walls 10 and a back and bottom wall 11, all formed preferably from a single piece of suitable material, such as sheet metal. This channel-shaped member may be wider and deeper than the usual window channel, so that a channel 12 of the usual size may be embraced within the deep channel member and secured thereto by any suitable means such as the rivets 13. This channel member 12 may be of any suitable known construction, such for example as that shown in Schlegel Patent No. 1,847,700, issued March 1, 1932, or that shown in Schlegel Patent No. 1,895,688, issued January 31, 1933, or that shown in Schlegel Patent No. 1,928,574, issued September 26, 1933, to mention only a few of the possible constructions already known to those skilled in the art. In this inner channel 12 may be any suitable cushioning means indicated diagrammatically at 15, such for example, as the cushioning means shown in any of the above mentioned prior patents. Cushioning means in the form of relatively long stiff pile such as disclosed in the above mentioned Patent No. 1,847,700, is frequently preferred and is here shown diagrammatically in the drawing.

The two side walls 10 of the deep channel body preferably do not extend through the entire depth desired in the channel, but are terminated somewhat short of the intended extreme outer edge of the channel and are provided with slits or slots 20 extending inwardly from the outer edge to subdivide a portion of the outer edge into a plurality of tongues 21 and 22. Alternating tongues, such as those designated by the numeral 21, may be displaced laterally in one direction, with the intermediate tongues 22 displaced laterally in the opposite direction. Then a cushioning element is placed between the tongues 21 and 22 and held in place thereby.

The cushioning element comprises a woven body 25 which may be of flexible or semi-flexible material such as felt or a woven textile fabric of any suitable kind. Preferably it is a textile body woven from weft strands 26 and warp strands 27 indicated diagrammatically in Fig. 4. Some or all of the weft strands 26 are preferably formed of metallic wire to stiffen the body, while some or all of the warp strands 27 may be woven of any suitable non-metallic textile material, such as cotton or linen.

The body 25, as shown, lies substantially in the plane of its associated side wall 10 of the metallic channel, and forms, in effect, an outward continuation or prolongation of the side wall. The inner edge of the cushioning element may have a binding strip 30 of suitable sheet material, such as sheet metal, wrapped around the edge as shown, and this bound edge is then clamped between the tongues 21 and 22, which are forced toward a common plane so as to clamp the edge of the cushioning element firmly between them, as is plainly apparent from Fig. 3 of the drawing.

The cushioning element body 25 may itself form the desired cushioning pads, or separate cushioning pads may be formed on one or both side walls of the body 25. Such cushioning pads may be in the form of the relatively long stiff pile disclosed in the above mentioned Schlegel Patent No. 1,847,700, or in the form of the cushioning pads disclosed in any of the other above mentioned Schlegel patents, or of relatively long uncut loops as disclosed in the copending application of Charles P. Schlegel, Serial No. 595,352, filed February 26, 1932, for Window channels, or in any other form known to those skilled in the art. Preferably, however, relatively long stiff pile is used to form the cushioning pads, and this pile may be formed substantially as disclosed in the copending application of Charles P. Schlegel, Serial No. 660,402, filed March 11, 1933, for Window channel. In this last mentioned application, long stiff pile is applied to a woven base, woven in part from metallic wires, and this construction is especially suitable in the present instance.

Figure 3:
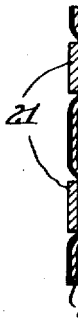
Fig. 3 is a longitudinal section substantially on the line 3—3 of Fig. 1.
Figure 4:
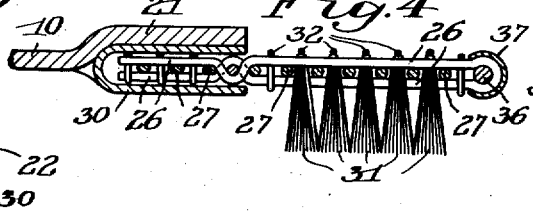
Fig. 4 is a diagrammatic view on a larger scale showing part of the structure illustrated in Fig. 2.

The weft strands 26 shown in Fig. 4 of the present drawing, may correspond, for example, to the strands 23 shown in Fig. 3 of the drawing of the last mentioned Schlegel application, these strands preferably being mostly or wholly of metal, while the non-metallic warp strands 27 of the present application may correspond to the non-metallic strands 21 in the last mentioned Schlegel application. The cushioning pad may be formed, as in the Schlegel application, by relatively long stiff pile strands 31 (corresponding to the pile 30 or 31 of the Schlegel application) woven into the body or foundation strands as disclosed, for example, in said Schlegel application, and held, for example, by weft strands 32 corresponding to the strands 22 of the Schlegel application. These cushioning strands 31 may be formed on one or both sides of the body 25. If only on one side, then they preferably extend inwardly from the inner side of the body 25 toward the mid plane of the channel, to provide adequate cushioning support for a window glass indicated at 34.

One or both of the outer edges of the cushioning elements 25 may be provided with a bead 37 formed of any suitable sheet material, such as sheet metal, bent to a rounded cross section and embracing a portion of the outer edge of the cushioning element body 25 and running longitudinally along this edge, as shown. The edge of the cushioning element may be somewhat enlarged, if desired, in order that the bead 37 may grip it more firmly, such enlargement being secured, for example, by the use of an enlarged warp strand 36 extending along the body 25 approximately at its edge. These beads 37 not only assist in holding the edges of the somewhat flexible cushioning elements straight and true, but also provided a decorative finish for the outer edges of the channel when these edges are used in a position in which they are exposed to view.

Figure 2:
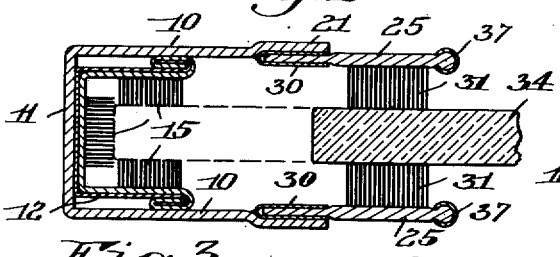
Fig. 2 is a transverse section taken substantially on the line 2—2 of Fig. 1.

The channel 12 with its cushioning means 15 provides cushioning support for the edge of the window 34 when the window is moved toward the back or base of the channel, which may be to the fully closed position of the window, and which is shown in dotted lines in Fig. 2. The cushioning pads 31 also cushion the sides of the window when it is in this position, and furthermore provide cushioning support for the window when it is moved slightly outwardly with respect to the channel, from the dotted line position to the full line position shown in Fig. 2 of the drawing. Such a movement may be made to open part of the window for ventilating purposes or the like, as understood by those skilled in the art.

Figure 7:
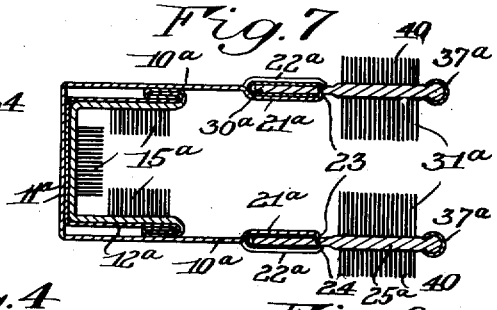
Fig. 7 is a transverse section substantially on the line 7—7 of Figs. 5 and 6.
Figure 8:
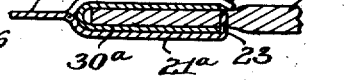
Fig. 8 is a view similar to a fragment of Fig. 7, on a larger scale, to illustrate details.

In Figs. 5 to 8, inclusive, of the drawing there is shown a modified embodiment of the invention which is preferred under some conditions. Here, the various elements of the construction may be identical with those of the construction shown in Figs. 1 to 4 except as hereafter noted, and corresponding elements are designated in Figs. 5 to 8 by the same reference numerals used in Figs. 1 to 4, with the addition of the letter "a". Thus the cushioning element in Figs. 7 and 8 is designated 25a, while that in Fig. 2 is designated as 25.

The principal difference between the construction now being described and the previous construction, is that the slits which form the tongues 21a and 22a, instead of being substantially parallel to each other to make substantially rectangular tongues, are at an angle to each other to makes tongues which are not rectangular. The tongues 21a are preferably approximately triangular as shown, with relatively sharp points at their outer ends, and these points are turned over as indicated at 23 to extend in a direction substantially at right angles to the plane of the associated wall 10a, so that when the tongues 21a and 22a are pressed toward each other to clamp the cushioning element between them, the sharp points 23 (lying preferably just beyond the edge of the binding strip 30a) press firmly into and partly through the cushioning element 25a and thus lock it securely in place. Also, the extreme outer edges of the other tongues 22a may extend to a point slightly beyond the edge of the binding strip 30a and may be bent down slightly over the edge of the binding strip, as shown at 24 in Figs. 7 and 8, to assist in holding the cushioning elements securely.

With this construction, because of the secure interlock between the points 23 and the cushioning element, the various tongues themselves need not be so solid and rigid as in the preceding embodiment, and consequently the sheet metal or other material from which the channel member 10a is made may be considerably thinner than in the preceding case. By comparing Figs. 2 and 4 of the drawing with Figs. 7 and 8, it will be seen that the sheet metal 10a in the latter figures is indicated as being materially thinner than sheet metal 10 in the former figures.

As previously stated, the cushioning pads may be formed on one or both sides of the cushioning elements 25, and in Fig. 7 there are shown cushioning pads 40 on the exterior surfaces of the cushioning elements 25a as well as the cushioning pads 31a on the interior surfaces. These cushioning pads 40 may be formed in any suitable known manner, as disclosed, for example, in the patents and applications above mentioned, but preferably are formed from relatively long stiff pile in the manner above referred to in connection with the pads 31.

When the channel is placed in a groove or rabbet of the window frame of the vehicle to which it is applied, the pads 40 on the exterior of the cushioning element provide cushioning between the channel and side walls of the groove or rabbet, and thus prevent rattling or squeaking which might be caused by direct contact of the channel with the walls. Obviously such exterior cushioning may be applied to the form of channel shown in Fig. 2 as well as to that shown in Fig. 7.

While certain embodiments of the invention have been disclosed, it is to be understod that the inventive idea may be carried out in a number of ways. This application is therefore not to be limited to the precise details described, but is intended to cover all variations and modifications thereof falling within the spirit of the invention or the scope of the appended claims.

I claim:

1. A window channel comprising a channel shaped body of sheet material having a side wall with a series of slits therein to provide a series of tongues, certain of said tongues having relatively sharp points thereon, a flexible member inserted between and clamped by said tongues with said sharp points extending into said member, said member extending outwardly therefrom substantially in the plane of said wall, and cushioning means secured to said flexible member.

2. A window channel comprising a channel shaped body of sheet material having a side wall with a series of slits therein to provide a series of tongues, a flexible member inserted between and clamped by said tongues and extending outwardly therefrom substantially in the plane of said wall, and cushioning means including relatively long stiff pile secured to said flexible member.

3. A window channel comprising a channel shaped body of sheet material having a side wall with a series of slits therein to provide a series of tongues, a flexible member inserted between and clamped by said tongues and extending outwardly therefrom substantially in the plane of said wall, a bead of relatively stiff sheet material secured to and extending substantially along the outer edge of said flexible member out of contact with said tongues, and cushioning means secured to said flexible member between said bead and said tongues.

4. A window channel comprising a channel shaped body of relatively stiff sheet material having a side wall with a series of slits extending inwardly from an outer edge thereof to provide a series of tongues, a flexible cushioning element, a metallic binding strip extending around and tightly embracing one edge of said flexible element, and a bead of relatively stiff sheet material embracing and running substantially along another edge of said flexible element, said binding strip and the edge of said element embraced thereby being inserted between said tongues and tightly clamped by them to fasten said element to said wall, and said element including means forming a cushioning pad between said binding strip and said bead.

5. A window channel comprising a channel shaped body of relatively stiff sheet material having a side wall with a series of slits extending inwardly from an outer edge thereof to provide a series of tongues, a cushioning element including a body of woven textile material and means forming a cushioning pad on one side of said body, and a binding strip of sheet material extending around and embracing one edge of said body, said binding strip and said embraced edge of said body being inserted between said tongues and tightly clamped thereby to fashion said cushioning element to said wall.

6. A window channel comprising a channel shaped body of relatively stiff sheet material having a side wall with a series of slits extending inwardly from an outer edge thereof to provide a series of tongues, a cushioning element including a body of woven textile material having a plurality of metallic stiffening strands woven therein and means forming a cushioning pad on one side of said body, and a binding strip running along one edge of said body, said strip and said edge being inserted between said tongues and clamped thereby.

7. A cushioning construction comprising a sheet of relatively stiff material having a series of slits extending inwardly from one edge thereof to provide a series of tongues, a cushioning element including a body of woven textile material and means forming a cushioning pad on one side of said body, and a binding strip of sheet material extending around and embracing one edge of said body, said binding strip and said embraced edge of said body being inserted between said tongues and tightly clamped thereby to fasten said cushioning element to said sheet of relatively stiff material.

8. A cushioning construction comprising a sheet of relatively stiff material having a series of slits extending inwardly from one edge thereof to provide a series of tongues, a body of woven textile material having one edge inserted between said tongues and held thereby, said body of woven textile material including stiffening strands of metallic wire woven thereinto and extending in a general direction from the edge of said body inserted between said tongues toward the opposite edge thereof, said body of textile material forming in effect substantially a prolongation of said sheet of relatively stiff material, and means forming a cushioning pad on said woven textile body.

9. A cushioning construction for windows and the like, comprising a sheet of metal, a body of woven textile material having one edge secured to said sheet metal and extending beyond said sheet metal to form in effect a prolongation thereof, said body including stiffening strands of metallic wire woven thereinto and extending in a general direction from the edge of said body secured to said sheet metal toward the opposite edge thereof, and means forming a cushioning pad on said woven textile body.

10. A window guiding and cushioning construction comprising a strip of flexible material lying approximately flat in a plane approximately parallel to and spaced from a surface of a window, said strip having flexible wire portions associated therewith and extending in a generally transverse direction with respect to said strip to impart transverse stiffness thereto, a body of relatively long stiff pile projecting from one face of said strip toward and substantially into contact with said surface of said window, and two separate metallic stiffening elements running longitudinally along said strip, one adjacent each marginal edge thereof.

11. A window guiding and cushioning construction comprising two strips arranged on opposite sides of a window and approximately opposite each other, each of said strips including a body lying approximately flat in a plane approximately parallel to and spaced from a surface of the window, cushioning pad means projecting laterally from said flat body toward and into engagement with said window so that the window is embraced between the cushioning pad means on the two bodies, and two separate metallic stiffening elements running lengthwise along each of said flat bodies, one adjacent each edge thereof.

12. A window guiding and cushioning construction comprising two strips arranged on opposite sides of a window and approximately opposite each other, each of said strips including a body lying approximately flat in a plane approximately parallel to and spaced from a surface of the window, a substantial part of said body being formed of textile material woven from weft strands mainly of metallic wire filaments and from warp strands mainly of non-metallic material, a cushioning pad of relatively long stiff pile running lengthwise along said body and projecting laterally therefrom toward and substantially into engagement with said window so that the window is embraced between the pads of pile on the two bodies, and two separate metallic elements running lengthwise along each of said two bodies, one adjacent each edge thereof.

13. A weather stripping construction for windows and the like, comprising a strip of woven textile material lying approximately flat in a plane approximately parallel to and spaced from a surface of the window or the like, said strip having flexible wire portions associated therewith and extending in a generally transverse direction with respect to said strip to impart transverse stiffness thereto, means forming a cushioning pad projecting laterally from said strip toward and substantially into contact with said surface of said window or the like, and two separate metallic stiffening elements running longitudinally along said strip, one adjacent each marginal edge thereof.

14. The combination with a window or the like, of a window cushioning construction including a body strip formed at least in part of woven textile material, the entire width of the strip being substantially unbent and lying approximately flat in a plane approximately parallel to and spaced from a surface of a window, cushioning pad means projecting a substantial distance from one face of said strip toward and substantially into contact with said surface of said window, and two separate metallic stiffening elements running longitudinally along said strip, one adjacent each marginal edge thereof.

15. A construction according to claim 14, in which one of said stiffening elements is in the form of a split metallic tube embracing one marginal edge of said strip.

16. A construction according to claim 14, in which both of said stiffening elements are in the form of hollow metallic members extending around and embracing their respective marginal edges of said strip.

17. As a new article of manufacture, a device for mounting and cushioning windows and the like, comprising a strip of woven textile material lying approximately flat in a plane when in normal position of use, a body of relatively long stiff pile projecting a material distance from one face of said strip, and two separate metallic stiffening elements running lengthwise along said strip, one adjacent each marginal edge thereof, said strip also including stiffening wire means extending transversely across said strip approximately from one edge to the other thereof.

ADOLPH RYDQUIST.